US012552123B2

(12) United States Patent
Jordison et al.

(10) Patent No.: US 12,552,123 B2
(45) Date of Patent: Feb. 17, 2026

(54) COMPACTION OF POTASH INTO BRIQUETTES

(71) Applicant: The Mosaic Company, Tampa, FL (US)

(72) Inventors: David Jordison, Regina (CA); Kimberly Rinas, Regina (CA)

(73) Assignee: The Mosaic Company, Tampa, FL (US)

( * ) Notice: Subject to any disclaimer, the term of this patent is extended or adjusted under 35 U.S.C. 154(b) by 308 days.

(21) Appl. No.: 18/546,569

(22) PCT Filed: Feb. 15, 2022

(86) PCT No.: PCT/US2022/016446

§ 371 (c)(1),
(2) Date: Aug. 15, 2023

(87) PCT Pub. No.: WO2022/174186

PCT Pub. Date: Aug. 18, 2022

(65) Prior Publication Data

US 2024/0042719 A1 Feb. 8, 2024

Related U.S. Application Data

(60) Provisional application No. 63/149,451, filed on Feb. 15, 2021.

(51) Int. Cl.
*B30B 11/16* (2006.01)

(52) U.S. Cl.
CPC .................................. *B30B 11/165* (2013.01)

(58) Field of Classification Search
CPC ....... B30B 11/16; B30B 11/165; B30B 11/18; B30B 11/28; B30B 9/28
See application file for complete search history.

(56) References Cited

U.S. PATENT DOCUMENTS

| | | | | |
|---|---|---|---|---|
| 3,143,769 A * | 8/1964 | Komarek | .............. | B30B 11/165 100/907 |
| 3,550,205 A * | 12/1970 | Guseman | ................ | B30B 11/16 425/168 |

(Continued)

FOREIGN PATENT DOCUMENTS

| | | |
|---|---|---|
| CN | 2451325 Y | 10/2001 |
| CN | 211031357 | 7/2020 |

(Continued)

OTHER PUBLICATIONS

International Preliminary Report on Patentability corresponding to PCT/US2022/016446 dated Aug. 15, 2023.

(Continued)

*Primary Examiner* — Matthew Katcoff
(74) *Attorney, Agent, or Firm* — Husch Blackwell LLP

(57) ABSTRACT

A roller press comprising including a roller face defining a plurality of individual reliefs shaped and sized to compress feed material into a plurality of discrete briquettes, each of the individual reliefs defining a quadrilateral shaped depression having rounded corners to reduce stress concentrations in the resulting briquettes, wherein a pair of leading edge rounded corners are defined by a first radius and a pair of trailing edge rounded corners are defined by a second radius, the first radius being smaller than the second radius.

18 Claims, 5 Drawing Sheets

(56) References Cited

U.S. PATENT DOCUMENTS

| | | | | | |
|---|---|---|---|---|---|
| 3,905,744 | A * | 9/1975 | Woodward | B30B 11/165 | |
| | | | | 425/395 | |
| 3,907,485 | A * | 9/1975 | Komarek | B30B 11/165 | |
| | | | | 249/117 | |
| 3,980,745 | A | 9/1976 | Hendrickson et al. | | |
| 3,981,477 | A * | 9/1976 | Armbrust | B30B 11/165 | |
| | | | | 425/363 | |
| 4,306,846 | A * | 12/1981 | Komarek | B30B 11/165 | |
| | | | | 425/78 | |
| 4,589,831 | A * | 5/1986 | Weggel | B30B 11/165 | |
| | | | | 425/237 | |
| 5,215,765 | A * | 6/1993 | Bergendahl | B30B 11/165 | |
| | | | | 100/336 | |
| D811,454 | S * | 2/2018 | Sancilio | A61J 3/10 | |
| | | | | D15/136 | |
| 2019/0100709 | A1 | 4/2019 | Long et al. | | |
| 2024/0075676 | A1 * | 3/2024 | Larsson | B29C 51/002 | |

FOREIGN PATENT DOCUMENTS

| | | | |
|---|---|---|---|
| DE | 2200349 | A1 | 7/1973 |
| EP | 0025394 | | 9/1989 |
| JP | 2014050845 | | 3/2014 |
| RU | 2588925 | | 7/2016 |
| RU | 188710 | U1 | 4/2019 |

OTHER PUBLICATIONS

PCT Search Report corresponding to PCT/US2022/016446 dated Jun. 9, 2022.

PCT Written Opinion corresponding to PCT/US2022/016446 dated Jun. 9, 2022.

Supplementary Partial European Search Report corresponding to EP 22753521 dated Nov. 6, 2024.

Supplementary European Search Report corresponding to EP 22753521 dated Feb. 10, 2025.

* cited by examiner (Section BB)

(Section CC)

(Section CC)

COMPACTION OF POTASH INTO BRIQUETTES

RELATED APPLICATION

The present application is a U.S. National Phase Entry of PCT International Application No. PCT/US2022/016446, filed Feb. 15, 2022, which claims the benefit of U.S. Provisional Application No. 63/149,451 filed Feb. 15, 2021, which application is hereby incorporated herein in its entirety by reference.

TECHNICAL FIELD

The present disclosure relates generally to potash products and methods of producing potash products. More particularly, the present disclosure relates to devices and methods configured to directly fabricate discrete potash briquettes via a roller press.

BACKGROUND

Potash is the general name given to various inorganic compounds that contain potassium in a water-soluble form. A number of common potassium compounds exist, including potassium carbonate and potassium chloride. Deposits of potassium bearing materials are mined and processed to compound potash into a usable, often granular form. It is estimated that today worldwide potash production exceeds 30,000,000 tons. While most potash is used in various types of fertilizers, there are many other non-agricultural uses, including animal feed, food products, soaps, water softeners, deicer, and glass manufacturing among others.

Commodity and specialty potash products are typically produced either directly (e.g., via flotation or crystallization), or via compaction in roller presses. With reference to FIGS. 1A-B, conventional roller presses typically make use of one or more “corrugated” drums 50 (as depicted in FIG. 1A), in which potash is fed through a pair of drums, at least one of the drums having a textured surface with alternating ridges 52 and grooves 54 (as depicted in FIG. 1B). The purpose of the corrugated profile is to increase friction on the raw material to aid in compression.

A variety of corrugation profiles are available to accommodate various types of potash raw materials and desired end products. The resultant compression causes plastic deformation of the individual potash particles, which then interlock to form a cohesive product for further processing. The product from these presses is typically then crushed and screened over media to achieve a desired particle size distribution. The screened distribution size can range from tightly controlled granular markets to loosely controlled industrial markets.

Although conventional methods of commodity and special potash production have proven effective over the years, further improvements and advances in potash production are always desirable. In particular, a reduction in further processing, and increases in production rates and durability the final product are desired. The present disclosure addresses these concerns.

SUMMARY OF THE DISCLOSURE

Embodiments of the present disclosure provide a roller press assembly configured to compact potash into discrete briquettes directly, without further processing, thereby eliminating the need for further processing of the final product prior to shipping. Accordingly, embodiments of the present disclosure enable briquetted material product to be sold as produced, with no further crushing or screening operations required. Moreover, the briquetted material has fewer rough and broken edges as compared to conventional roller press material, which enables lower interlocking in material edges leading to improved product flow, and lower ratio free edge to central product mass, which results in less friable product and less subsequent dust generation during handling. Moreover, the hard smooth outer surface of the briquetted material can be used for imprinting a company logo or product brand for improved customer recognition. Additionally, embodiments of the present disclosure enable the production of briquetted materials with specified surface area mass ratios via an adjustable axial alignment technology.

Embodiments of the present disclosure have demonstrated a sustained increase in production rates from between about 50% to about 100% beyond conventional roller press operations of the prior art. Accordingly, embodiments of the present disclosure provide increased production rates, reduce operational and maintenance costs for a given output demand, and lower capital requirements in terms of total production rate.

One embodiment of the present disclosure provides a roller press including a roller face defining a plurality of individual reliefs shaped and sized to compress feed material into a plurality of discrete briquettes, each of the individual reliefs defining a quadrilateral shaped depression having rounded corners to reduce stress concentrations in the resulting briquettes, wherein a pair of leading edge rounded corners are defined by a first radius and a pair of trailing edge rounded corners are defined by a second radius, the first radius being smaller than the second radius.

In one embodiment, the quadrilateral shaped depression of each of the individual reliefs has a first length along a rotational direction, and a second length along an axial direction. In one embodiment, the first length along the rotational direction has a dimension in a range between about 0.5 inches and about 2 inches. In one embodiment, the first length has a dimension of about 1.5 inches. In one embodiment, the second length along the axial direction has a dimension in a range between about 0.5 inches and about 2 inches. In one embodiment, the second length has a dimension of about 1.7 inches. In one embodiment, the second length has a larger dimension than the first length. In one embodiment, the roller face further defines one or more lands positioned between the plurality of individual reliefs. In one embodiment, the one or more lands have a width has a dimension in a range of between about 0.05 inches and about 0.1 inches. In one embodiment, the one or more lands has a dimension of about 0.075 inches. In one embodiment, the plurality of individual reliefs generally form a spiral pattern around the roller face. In one embodiment, every third individual relief along an axial direction of the roller face is aligned.

Another embodiment of the present disclosure provides a roller press system, including a first roller press defining a plurality of individual reliefs shaped and sized to compress feed material into a plurality of discrete briquettes, a second roller press defining a plurality of individual reliefs shaped and sized to compress feed material into a plurality of discrete briquettes, and an actuator mechanism configured to enable precision alignment of the first roller press relative to the second roller press, thereby enabling adjustment of a surface area to volume ratio of resultant briquettes.

In one embodiment, each of the individual reliefs define a quadrilateral shaped depression having rounded corners to reduce stress concentrations in the resulting briquettes, wherein a pair of leading edge rounded corners are defined by a first radius and a pair of trailing edge rounded corners are defined by a second radius, the first radius being smaller than the second radius. In one embodiment, the plurality of individual reliefs generally form a spiral pattern around the roller face. In one embodiment, every third individual relief along an axial direction of the roller face is aligned.

Another embodiment of the present disclosure provides a roller press including a roller face constructed of a high alloy, high-strength material defining a plurality of individual reliefs shaped and sized to compress feed material into a plurality of discrete briquettes, and a base constructed of a low alloy, high-strength material, wherein the roller face is used directly to the base via a weld overlay for improved corrosion resistance and increased mechanical strength.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

Figure 1A:
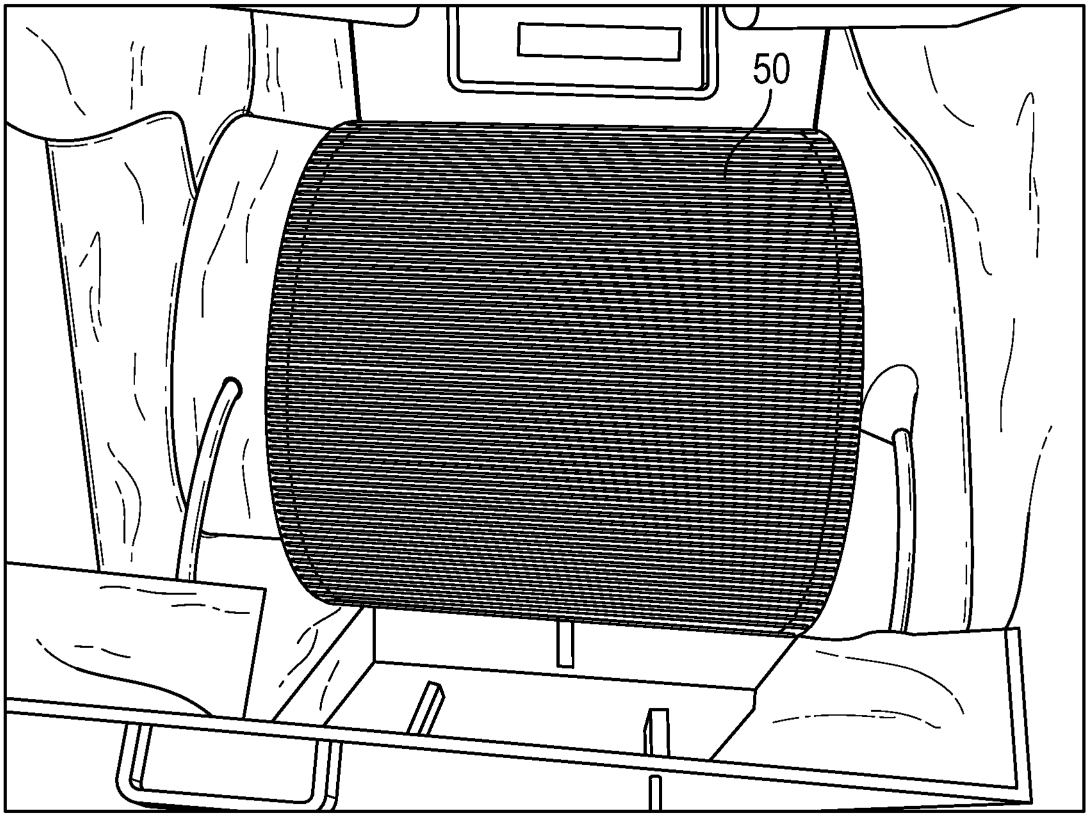
FIG. 1A (Prior Art)
FIG. 1A is a perspective view depicting a conventional roller press having a corrugated surface, in accordance with the prior art.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Figure 2:
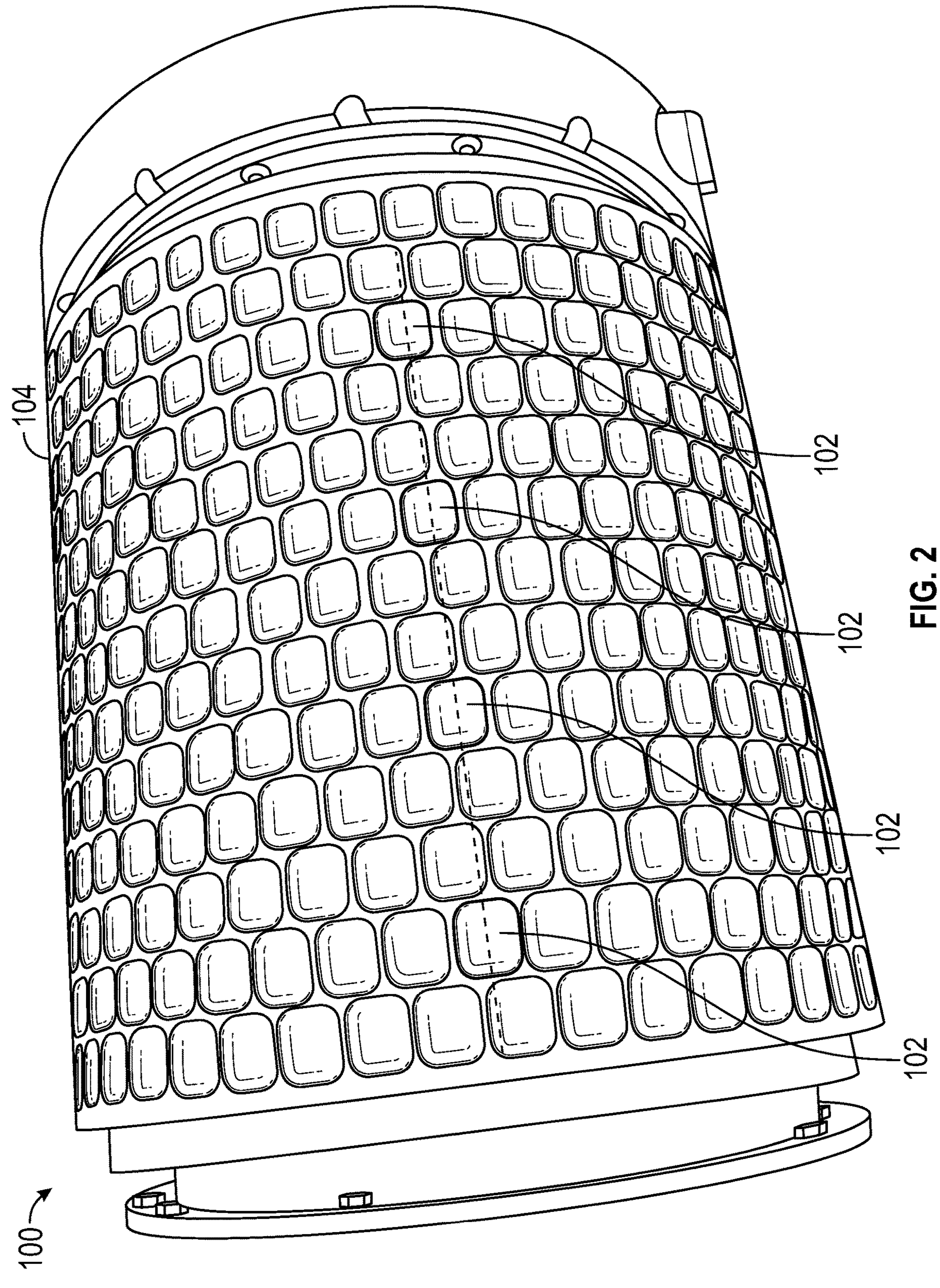
FIG. 2 is a perspective view depicting a roller press configured to compress a feed material into a series of discrete briquettes, in accordance with an embodiment of the disclosure

Referring to FIG. 2, a roller press 100 configured to compress the feed material (e.g., potash, etc.) into a plurality of discrete briquettes, is depicted in accordance with an embodiment of the disclosure, thereby eliminating the need for further processing (e.g., crushing, screening, etc.) of the final product. In some embodiments, the roller press 100 can feature a plurality of individual reliefs 102 (alternatively referred to herein as "pockets") defined in a face 104 of the roller press 100. The plurality of individual reliefs 102 can be shaped and sized to achieve substantially uniform compression forces to the feed material as it is fed through a pair of roller presses 100, thereby achieving a substantially uniform plastic deformation of the feed material for strong interlocking of the individual feed material particles with a smooth surface finish sufficient for direct production of a final product.

Figure 3A:
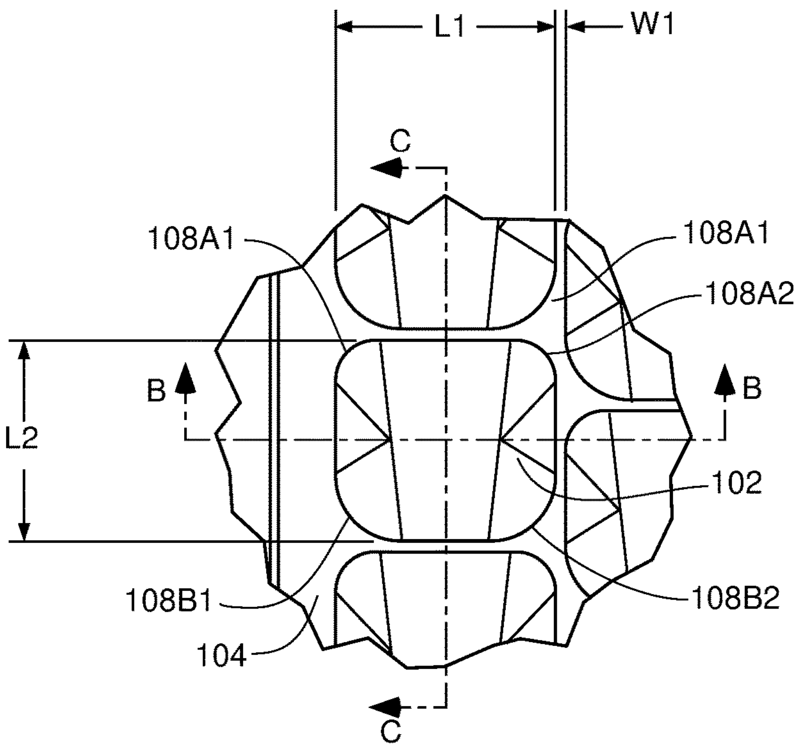
FIG. 3A is a partial, detailed plan view depicting an individual relief within a roller press, in accordance with an embodiment of the disclosure.
Figure 3B:
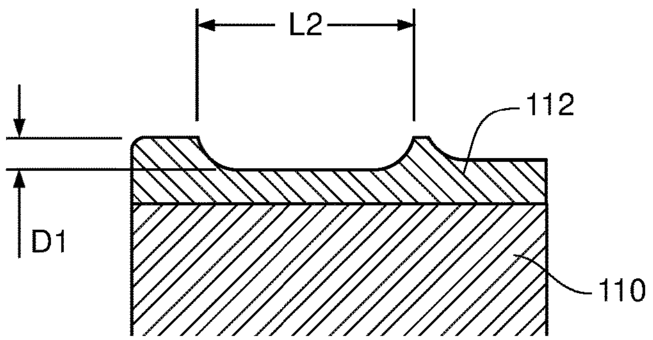
FIG. 3B is a partial, cross-sectional view depicting the individual relief of FIG. 3A along an axial plane, in accordance with an embodiment of the disclosure.
Figure 3C:
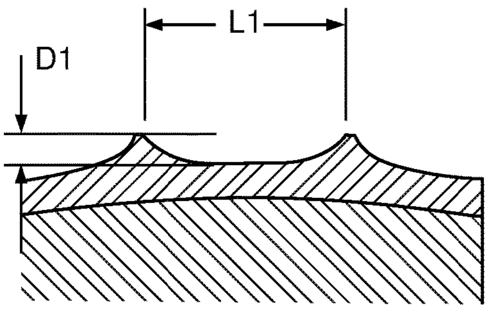
FIG. 3C is a partial, cross-sectional view depicting the individual relief of FIG. 3A along a rotational plane, in accordance with an embodiment of the disclosure.

With additional reference to FIGS. 3A-C, an individual briquette is formed when a quantity of feed material is encapsulated between two aligned reliefs 102 of opposing roller presses 100, thereby compressing the quantity of feed material into a discrete briquette. The individual reliefs 102 defining a generally quadrilateral shaped (e.g., four sided) depression extending along a rotational direction ($L_1$) (e.g., along a diameter of the roller press 100) and along an axial direction ($L_2$) (e.g., parallel to a longitudinal axis of the roller press 100). In some embodiments, a length of an individual relief 102 along a diameter of the roller press 100 can be between about 0.5 inches and about 2 inches. For example, in one embodiment, the individual relief 102 can have a length in the rotational direction ($L_1$) of about 1.5 inches. A length of individual relief 102 parallel to a longitudinal axis of the roller press 100 can be between about 0.5 inches and about 2 inches. For example, in one embodiment, the individual relief 102 can have a length in the axial direction ($L_2$) of about 1.7 inches. In some embodiments, the rotational lengths ($L_1$) of the individual reliefs 102 can generally be larger than the axial lengths ($L_2$) of the individual reliefs 102. In some embodiments, the individual reliefs 102 can have a depth ($D_1$) between about 0.125 inches and about 0.375 inches. For example, in one embodiment, the individual reliefs 102 can have a depth ($D_1$) of about 0.25 inches. Other dimensions of the individual reliefs 102 are also contemplated.

The surface area on the face 104 between individual reliefs 102, (referred to herein as is a land area or lands 106), can be minimized, as this surface area 106 is generally considered unproductive in the formation of briquettes. In particular, feed material trapped between respective lands 106 of a pair of roller presses 100 is not subjected to the compressive forces necessary to generate the degree of plastic deformation sufficient to interlock the individual feed material particles, and is therefore recycled as feed material. Although the land area 106 is ideally kept as small as possible, the lands 106 are generally shaped and sized to meet structural demands, in particular to withstand stress loading during peak compression of the feed material. For example, in some embodiments, the lands 106 can have a width (Wi) of between about 0.05 inches and about 0.1 inches, with the land areas 106 adjacent to filleted corners of the individual reliefs 102 having relatively larger widths. For example, in one embodiment, the lands 106 can have a width (Wi) of about 0.075 inches between individual reliefs 102; although other dimensions of the lands 106 are also contemplated.

In some embodiments, the individual reliefs 102 can have filleted or rounded corners 108, thereby producing a briquette with rounded corners. In some embodiments, a radius of the corners 108 can be dimensioned to reduce stress concentrations in the resulting briquettes. For example, in some embodiments, the corners 108A1-2 positioned on the leading edge of the roller press 100 (e.g., making first contact during rotation) can have a first radius, while the corners 108B1-2 positioned on the trailing edge can have a second radius. In some embodiments, the leading edge corners 108A1-2 can have a smaller radius than the trailing edge corners 108B1-2.

In particular, forming the individual reliefs 102 with the leading edge corners 108A1-2 having relatively smaller radii than the trailing edge corners 108B1-2 generally results in the feed material more completely filling in the individual reliefs 102 prior to compaction. Moreover, a non-symmetrical design of the individual reliefs 102 creates a more uniform distribution of compaction stresses moving through the feed material, as well as more complete particle deformation, which in some embodiments can reduce the presence of a weakened plane running through the center of the briquette where the two halves of the briquette fuse together (e.g., midway between the two roller presses 100). Further, the relatively larger radii of the trailing edge corners 108B1-2 generally aids in ejection of the briquette from the relief 102 post compaction.

Figure 1B:
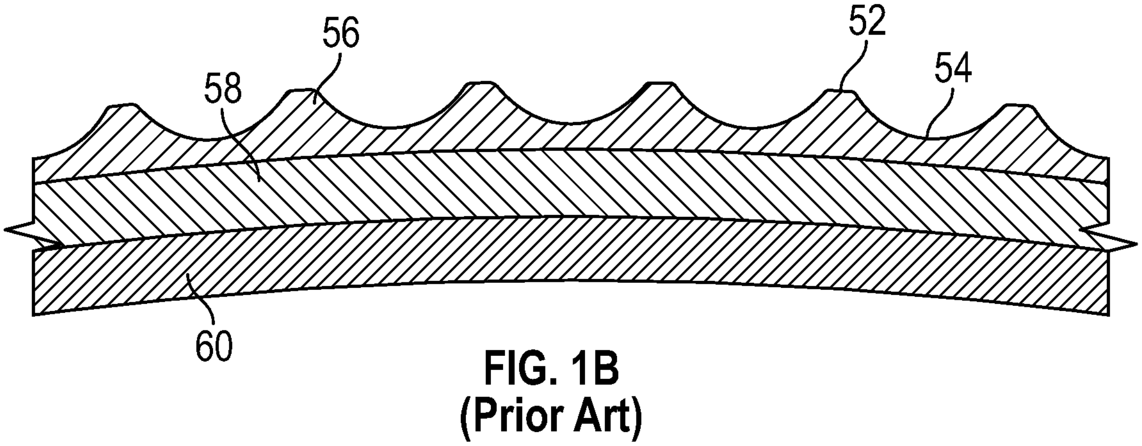
FIG. 1B (Prior Art)
FIG. 1B is a cross-sectional view of a conventional corrugated surface of a roller press, in accordance with the prior art.

With continued reference to FIG. 1, in some embodiments, the individual reliefs 102 can be evenly spaced around the circumferential face 104 of the roller press 100. Further, in some embodiments, the individual reliefs 102 can be axially offset from one another in the axial direction, so as to generally form a spiral pattern of individual reliefs 102 around the circumferential face 104. For example, the pattern of individual reliefs 102 can be configured such that every third column of reliefs 102 along a given axial line is aligned with one another (such as that depicted in FIG. 2); although other patterns of individual reliefs 102 (e.g., alignment of every other column, every fourth column, etc.) are also contemplated.

As opposed to uniform rows of individual reliefs (e.g., a series of individual reliefs 102 axially aligned with one another along a longitudinal axis of the roller press 100), formation of a spiraling pattern of individual reliefs 102 can enable peak compressive loads to be applied to a subset of individual reliefs 102 (e.g., every third individual relief along a longitudinal axis of the roller press). Accordingly, in some embodiments, at any given time feed material within a first set of reliefs 102 can be in a pre-consolidation phase (e.g., prior to center plane), compressed feed material within a second set of reliefs 102 can be in a peak compressive force phase (e.g., on center plane), and finished briquettes within a third set of reliefs 102 can be in a stress relief/ejection phase (e.g., after center plane).

That is, whereas uniform rows of individual reliefs would result in a peak stress being applied evenly to the entire width of the roller press 100, formation of a spiraling pattern can enable an increased peak compressive force on particles within specific individual reliefs 102 during operation. In some embodiments, the peak compressive force can be increased by a factor of 1 divided by the number of reliefs 102 in alignment across the face 104, divided by the total number of reliefs 102 across the face 104.

Figure 4B:
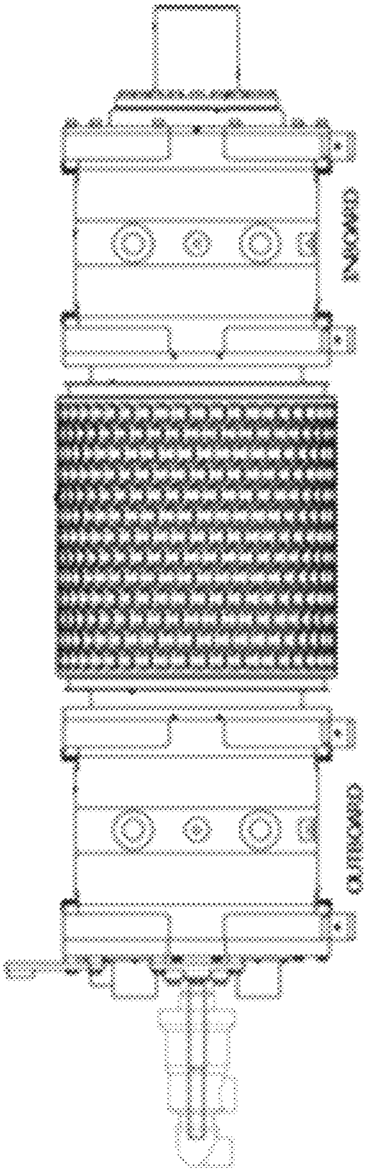
FIG. 4B is a profile view depicting the axial alignment thrust surface assembly of FIG. 4A.
Figure 4A:
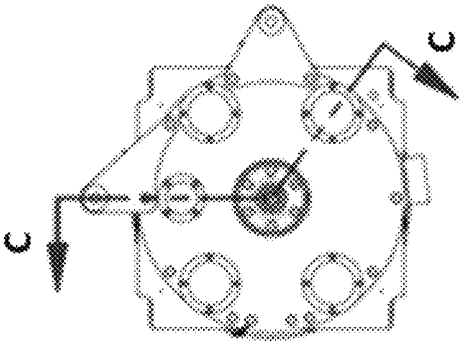
FIG. 4A is an end view depicting an axial alignment thrust surface assembly, in accordance with an embodiment of the disclosure.
Figure 4C:
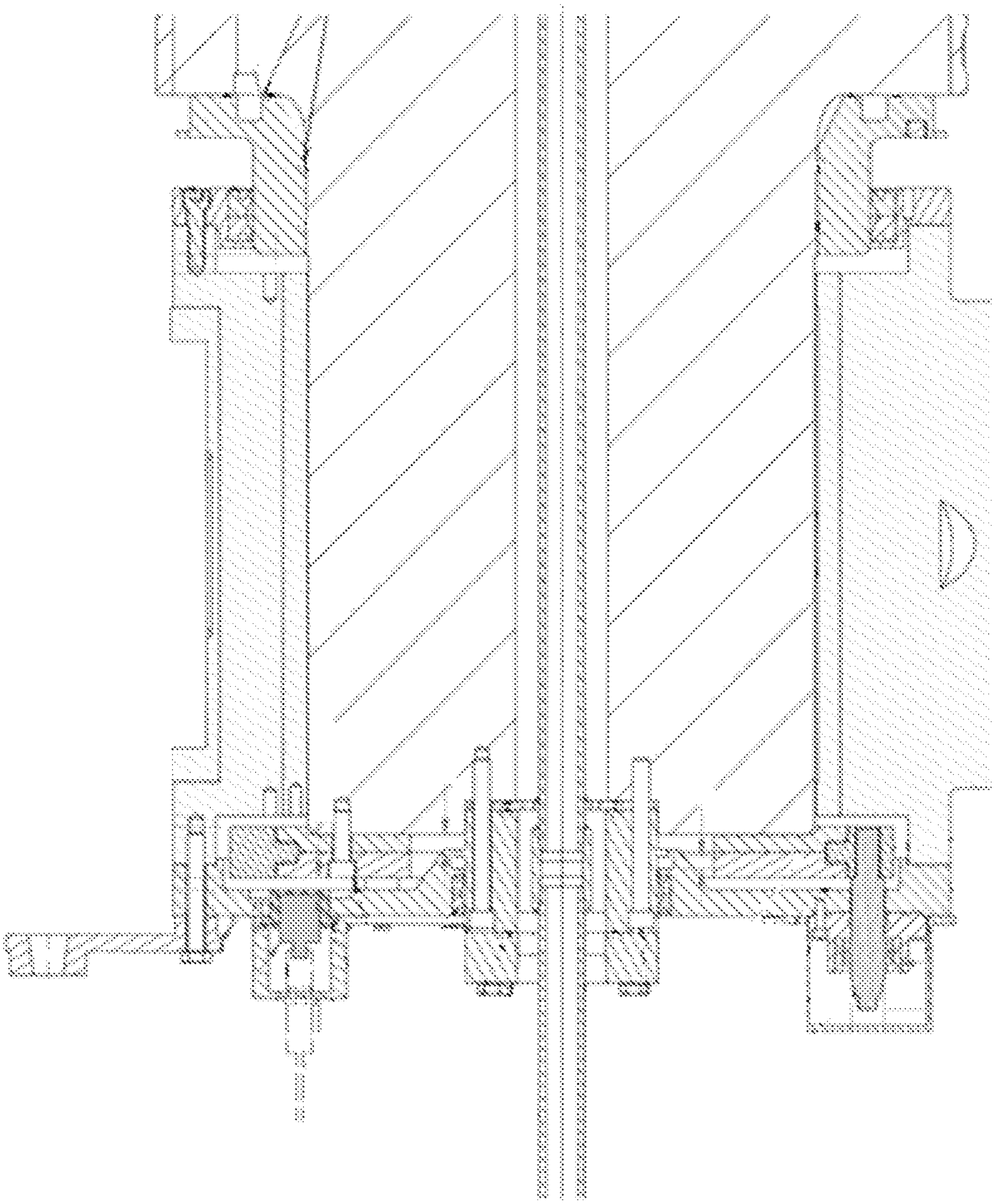
FIG. 4C is a cross-sectional view depicting the axial alignment thrust surface assembly of FIG. 4B.

With additional reference to FIGS. 4A-C, in some embodiments, it is possible to adjust an axial and/or rotational alignment of a pair of roller presses 100 relative to one another in order to modify quality characteristics of a resultant product. Adjustment of an axial or rotational alignment of the roller presses relative to one another directly impacts the surface area to volume ratio of resultant briquettes, with the surface area to volume ratio increasing as the alignment is shifted away from matching relief profiles. In this manner, quality characteristics, such as friability and dissolution rate can be managed to achieve specific targets.

Accordingly, in some embodiments, at least one of the roller presses 100 can include an actuator mechanism configured to provide precision alignment of the roller presses 100 in an axial direction, while maintaining normal thrust clearances and providing normal rotational freedom. In some embodiments, precision alignment of the roller presses 100 can be accomplished by removal of inner thrust surfaces from the roller press side mounted towards the motor/gearbox assemblies, and repositioning the thrust surfaces on an outer face. In some embodiments, precision alignment of the roller presses 100 can be accomplished by the use of a shoe and follower assembly to move all of the thrust surfaces from within the assembled roller/bearing block assembly to the outer surface of the outer block bearing block.

To position the roller press 100 within the thrust bearing clearances while free to move, and hold during final positioning and tightening, the actuator mechanism can provide linear axial force and subsequent displacement via hydraulic or manual methods. In some embodiments, the actuator mechanism can be a modular design, which is selectively installable and/or removable based on the desired operational controls. Accordingly, in some embodiments, the actuator mechanism includes the ability to set or reset desired axial alignment of roller presses without substantial disassembly or removal of roller press/bearing blocks from the machine frame; the ability to actively monitor position of roller press within thrust clearance spaces via analog or digital technologies; and the ability to maintain, replace, or otherwise access the wear surfaces of the thrust bearings for any purpose including maintenance.

With continued reference to FIGS. 3A-C, in some embodiments, the face material 112 of the roller press 100 can be directly joined to an underlying base material 110. In a conventional roller assembly of the prior art (such as that depicted in FIGS. 1A-B), a high alloy, high-strength (HAHS) steel (e.g., nickel-chromium alloy 625, or the like) is used for the roller press face material 56 to provide sufficient corrosion resistance, as well as mechanical strength for the compressive forces experienced during roller compaction. This HAHS face material 56 is bonded to a low alloy, high-strength (LAHS) (e.g., AISI 4340 alloy steel, or the like) steel base 60 via weld fusion, in which it is first necessary to overlay a medium alloy, medium strength (MAMS) steel layer 58 (e.g., a 309L buffer weld, or the like) on the LAHS base 60 prior to attaching the HAHS face 56. In particular, the MAMS layer 58 is necessary to absorb excess hydrogen, to avoid embrittlement of the HAHS 56, as well as to aid in joining of the dissimilar metallurgies of the HAHS and LAHS materials 56, 60.

By contrast, embodiments of the present disclosure enable the elimination of the MAMS layer as an intermediate layer. In particular, embodiments of the present disclosure including thickening of the HAHS weld overlay from about 0.25 inches to about 0.50 inches, which in turn entails turning down of the underlying base material 110 to a smaller outside diameter to achieve the same final dimensions of the roller press 100. Elimination of the MAMS layer enables a thicker more corrosion resistant cladding layer to be added to the roller press 100, which enables an increased depth of relief 102 cutouts, particularly in comparison to a normal corrugation depth on a conventional roller assembly of the prior art. Additionally, weld techniques enable a high quality fusion between the two dissimilar HAHS and LAHS materials, without embrittlement of the surface of the HAHS material for subsequent machining operations.

Elimination of the MAMS layer provides improved corrosion resistance and increased mechanical strength, sufficient to withstand the need bending forces experienced during the briquetting process, particularly a spiral pattern of individual reliefs 102 around the circumferential face 104 enable adjacent reliefs 102 to be in different phases of operation (e.g., pre-consolidation phase, peak compressive force phase, and stress relief/ejection phase).

For example, in some embodiments, a filler metal (e.g., ERNiCrMo-3) can be overlaid onto the LAHS cast annealed base metal using a Submerged Arc Welding Process (SAW), in a flat-1G position (e.g., allowing up to 15-degrees of inclination). In some embodiments, the process can be semi-automatic using a basic flux for atmospheric control to produce the weld overlay/clad in multi-pass layers on the LAHS base. A nominal welding current and voltage can range between about 350 A and about 450 A, and about 29 V to about 30 V, respectively. During construction, the roller press 100 can be subjected to a series of heat treatments, including an initial treatment of between about 550° F. to about 575° F., at least one intermediate treatment of about 400° F., and a final treatment of between about 900° F. and about 1000° F. Following the final heat treatment cycle, in some embodiments, the roller press 100 can be allowed to cool within the furnace.

Table 1 (below) represents a one embodiment of a chemical composition of the low alloy, high-strength (LAHS) steel base 60 (by percent weight), which in some embodiments can be constructed of an AISI 4340 steel alloy having a BHN hardness of 202.

TABLE 1

| C | Mn | P | S | Si | Cu | Ni | Cr | Mo | Al |
|---|---|---|---|---|---|---|---|---|---|
| 0.42 | 0.76 | 0.009 | 0.024 | 0.28 | 0.16 | 1.67 | 0.88 | 0.28 | 0.031 |

Table 2 (below) represents one embodiment of a chemical composition of the filler material (by percent weight), which in some embodiments can be an ERNiCrMo-3 nickel filer metal.

TABLE 2

| C.40 | Mn | Fe | p | S | Si | Mo | Cu | Ni | Al | Ti | CR | Nb |
|---|---|---|---|---|---|---|---|---|---|---|---|---|
| 0.1 | 0.5 | 0.5 | 0.02 | 0.015 | 0.5 | .8-.1 | 0.5 | 0.58 | 0.4 | 0.4 | .20-.23 | .3-.4 |

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A roller press comprising:

a roller face defining a plurality of individual reliefs shaped and sized to compress feed material into a plurality of discrete briquettes, each of the individual reliefs defining a quadrilateral shaped depression having rounded corners to reduce stress concentrations in the resulting briquettes, wherein a pair of leading edge rounded corners are defined by a first radius and a pair of trailing edge rounded corners are defined by a second radius, the first radius being smaller than the second radius.

2. The roller press of claim 1, wherein the quadrilateral shaped depression of each of the individual reliefs has a first length along a rotational direction, and a second length along an axial direction.

3. The roller press of claim 2, wherein the first length along the rotational direction has a dimension in a range between about 0.5 inches and about 2 inches.

4. The roller press of claim 3, wherein the first length has a dimension of about 1.5 inches.

5. The roller press of claim 2, wherein the second length along the axial direction has a dimension in a range between about 0.5 inches and about 2 inches.

6. The roller press of claim 3, wherein the second length has a dimension of about 1.7 inches.

7. The roller press of claim 2, wherein the second length has a larger dimension than the first length.

8. The roller press of claim 1, wherein the roller face further defines one or more lands positioned between the plurality of individual reliefs.

9. The roller press of claim 8, wherein the one or more lands have a width has a dimension in a range of between about 0.05 inches and about 0.1 inches.

10. The roller press of claim 9, wherein the one or more lands has a dimension of about 0.075 inches.

11. The roller press of claim 1, wherein the plurality of individual reliefs generally form a spiral pattern around the roller face.

12. The roller press of claim 1, wherein every third individual relief along an axial direction of the roller face is aligned.

13. A roller press system comprising:

a first roller press defining a plurality of individual reliefs shaped and sized to compress feed material into a plurality of discrete briquettes;

a second roller press defining a plurality of individual reliefs shaped and sized to compress feed material into a plurality of discrete briquettes; and an actuator mechanism configured to enable precision alignment of the first roller press relative to the second roller press, thereby enabling adjustment of a surface area to volume ratio of resultant briquettes;

wherein each of the individual reliefs define a quadrilateral shaped depression having rounded corners to reduce stress concentrations in the resulting briquettes, wherein a pair of leading edge rounded corners are defined by a first radius and a pair of trailing edge rounded corners are defined by a second radius, the first radius being smaller than the second radius.

14. The roller press of claim 13, wherein the plurality of individual reliefs generally form a spiral pattern around the roller face.

15. The roller press of claim 13, wherein every third individual relief along an axial direction of the roller face is aligned.

16. A roller press comprising:

a roller face constructed of a high alloy, high-strength material defining a plurality of individual reliefs shaped and sized to compress feed material into a plurality of discrete briquettes;

wherein each of the individual reliefs define a quadrilateral shaped depression having rounded corners to reduce stress concentrations in the resulting briquettes, wherein a pair of leading edge rounded corners are defined by a first radius and a pair of trailing edge rounded corners are defined by a second radius, the first radius being smaller than the second radius; and a base constructed of a low alloy, high-strength material, wherein the roller face is used directly to the base via a weld overlay for improved corrosion resistance and increased mechanical strength.

17. The roller press of claim 16, wherein the plurality of individual reliefs generally form a spiral pattern around the roller face.

18. The roller press of claim 16, wherein every third individual relief along an axial direction of the roller face is aligned.

* * * * *